May 27, 1941.                F. C. HOLTZ                 2,243,098
                     ELECTRICAL MEASURING APPARATUS
                          Filed Aug. 7, 1939
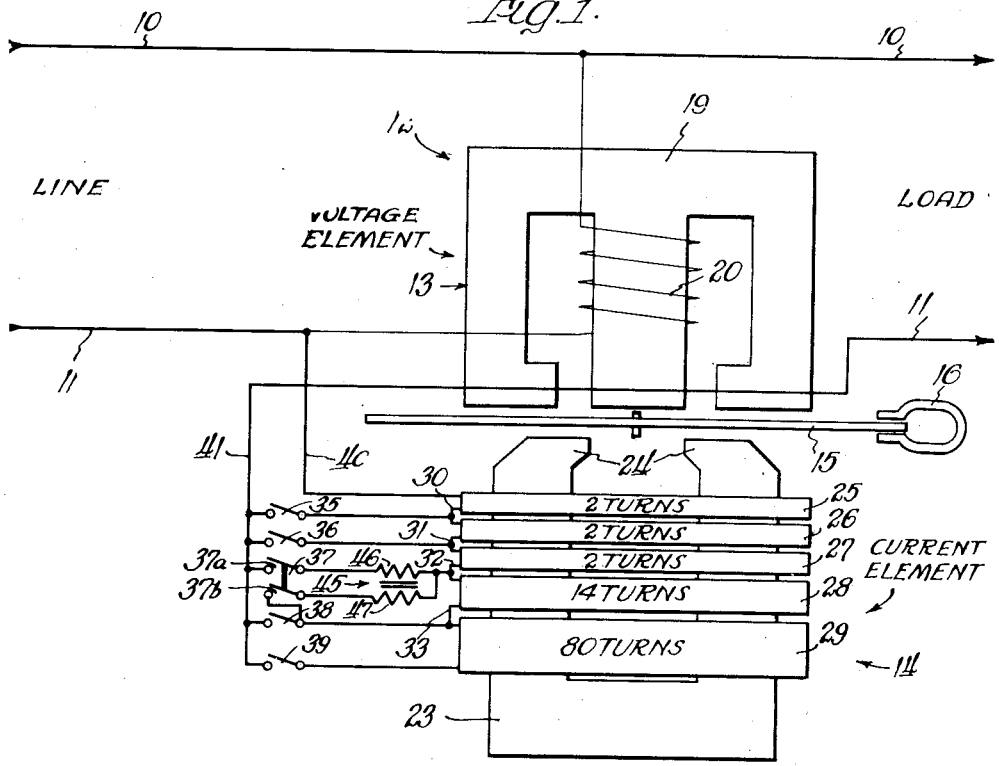
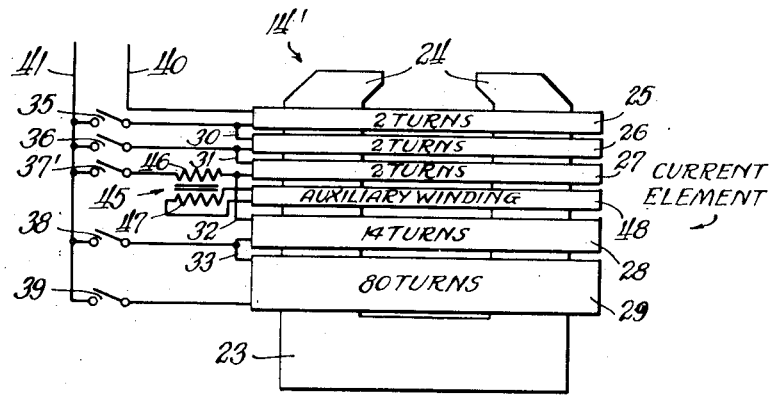
Inventor:
Frederick C. Holtz.

Patented May 27, 1941

2,243,098

UNITED STATES PATENT OFFICE 2,243,098

ELECTRICAL MEASURING APPARATUS

Frederick C. Holtz, Springfield, Ill., assignor to Sangamo Electric Company, Springfield, Ill., a corporation of Illinois Application August 7, 1939, Serial No. 288,712

4 Claims. (Cl. 171—264)

My invention relates, generally, to electric circuits and it has particular relation to the provision of certain circuit arrangements in electrical measuring apparatus, such as watthour meters.

It is customary to provide watthour meters for test purposes. It will be understood that they are usually of a portable type and that they are arranged to be connected into the circuit on which a meter is already installed for the purpose of checking its accuracy of registration. While the meters to be tested are designed to operate at different full load currents, depending upon the load that is connected to the circuit, it is obviously desirable to provide for testing watthour meters of different current ratings by using a single portable test watthour meter.

Watthour meters having full load currents of fifty, twenty-five, ten, five, and one amperes are widely used and the portable test watthour meter can be conveniently arranged to accommodate all of these different ratings. Since it is desirable that the same number of ampere turns be provided for rotating the disc of the portable watthour meter under each of the full load current ratings, the current element of the test meter is provided with five windings that can be selectively connected in series circuit relation. Since the core of the current element usually has two arms which should be symmetrically linked by the turns of each of the windings, it is desirable that each of the windings comprise an even number of turns. Moreover, since space for a large number of turns on the current element is limited, the number of turns for each winding should be kept at a minimum.

In a portable test watthour meter arranged to check the accuracy of watthour meters connected in circuits the full load rating of which is, respectively, fifty, twenty-five, ten, five, and one amperes, and in which one hundred ampere turns are provided for rotating the disc under each of the full load conditions, five windings are provided having, respectively, two, two, six, ten, and eighty turns. Obviously, the product of fifty amperes and two turns provides one hundred ampere turns. Likewise, when the two windings having two turns each are connected in series circuit relation and twenty-five amperes flow therethrough, one hundred ampere turns are provided. Also, when the windings having two, two and six turns, respectively, are connected in series circuit relation, one hundred ampere turns are provided on flow of ten amperes through the series circuit. Obviously, by connecting the windings having, respectively, ten turns and eighty turns in series circuit relation with the other windings, the one hundred ampere turns will be provided on flow, respectively, of five and one amperes.

There is a substantial demand by the industry for a portable test watthour meter that is capable of checking the accuracy of watthour meters having full load ratings of fifty, twenty-five, fifteen, five, and one amperes, the fifteen ampere rating taking the place of the ten ampere rating. It is not feasible, because of space limitations, to provide a combination of windings for taking care of the foregoing ampere ratings including the fifteen ampere rating and still provide an even number of turns for each windings. It is to a solution of this problem that the present invention is addressed.

An object of my invention is to provide a predetermined number of ampere turns on flow of different values of current through different combinations of series connected windings.

Another object of my invention is to provide for changing the number of ampere turns provided by current flow through a number of series connected windings alone to a predetermined number of ampere turns.

Other objects of my invention will, in part, be obvious and in part appear hereinafter.

My invention, accordingly, is disclosed in the embodiment thereof shown in the accompanying drawing, and it comprises the features of construction, combination of elements and arrangement of parts which will be exemplified in the construction hereinafter set forth, and the scope of the application of which will be indicated in the appended claims.

For a more complete understanding of the nature and scope of my invention, reference may be had to the following detailed description, taken in connection with the accompanying drawing, in which—

Figure 1 illustrates, diagrammatically, a portable test watthour meter embodying my invention; and Figure 2 illustrates, diagrammatically, another embodiment of my invention.

Referring first to Figure 1 of the drawing, it will be observed that the reference characters 10 and 11 designate, respectively, the conductors of a single phase circuit which interconnect a source of alternating current, represented as the line, and a power-consuming circuit represented by the load. It is assumed that a watthour meter is connected in the circuit represented by the conductors 10 and 11 which normally measures the energy consumed by the load, the accuracy of registration of which it is desired to check. The full load current of the circuit represented by the conductors 10 and 11 will, of course, depend upon the character of the load. For the purpose of the present invention it will be assumed that the circuit represented by the conductors 10 and 11 may have a full load capacity of fifty, twenty-five, fifteen, five, or one amperes, and that a test watthour meter, designated generally at 12, is provided which is capable of accurately checking the registration of watthour meters connected to load circuits having these different full load current ratings.

It will be observed that the test watthour meter 12 includes a voltage element, shown generally at 13, and a current element, shown generally at 14. The fluxes provided by the voltage and current elements 13 and 14 combine in a well known manner to effect the rotation of a disc 15, damped by a permanent magnet 16, which is employed for operating a register. As a matter of expediency it is desirable that the speed of rotation of the disc 15 be the same on flow of each of the different above-enumerated full load currents. This requires that the current element 14 be so arranged that, for each different full load current flow, the current element 14 provides the same number of ampere turns. The manner in which this result is effected will be presently set forth.

The voltage element 13 comprises a generally E-shaped core 19 having a voltage winding 20 on its central leg. The voltage winding 20 is connected across the conductors 10 and 11 in the customary manner.

The current element 14 comprises a generally C-shaped core 23 having a pair of arms 24 extending up toward the disc 15. Windings 25, 26, 27, 28 and 29 are provided on the core 23 of the current element 14 for energizing the same for different full load current ratings. To provide a balanced and symmetrical construction an even number of turns should be provided for each of these windings, since the core 23 comprises the two arms 24. The minimum number of turns that can be provided for the fifty ampere rating which will meet this requirement is two turns. On this basis, then, the minimum number of turns that can be provided for the twenty-five ampere rating is four turns. These four turns can be made up of the two turns for the fifty ampere rating and two additional turns. Accordingly, the windings 25 and 26 are made up of two turns each, as indicated.

In order to provide the fifteen ampere rating the winding 27 is also provided with two turns. However, on connection of the windings 25, 26 and 27 in series circuit relation, and flow therethrough of fifteen amperes, only ninety ampere turns are provided. In such case the speed of the disc 15 would be below the normal desired speed. If the winding 27 were provided with three turns or four turns, then on flow of fifteen amperes through the series connected windings 25, 26 and 27, the total ampere turns would be one hundred and five or one hundred and twenty, respectively, either of which would cause the disc 15 to rotate at a higher speed than the desired normal speed. The use of three turns has the objection before noted.

According to the present invention, however, the winding 27 is provided with two turns, as shown, and then means are provided for compensating for the ampere turns not otherwise provided.

With two turns on each of the windings 25, 26 and 27, the provision of fourteen turns on the winding 28 provides the proper combination for the five ampere rating. Likewise, the provision of eighty turns on the winding 29 provides for the one ampere rating.

As shown, the windings 25, 26, 27, 28 and 29 are connected in series circuit relation by jumpers 30, 31, 32 and 33. Switches 35, 36, 37, 38 and 39 are provided for connecting the windings in different series circuit combinations, depending upon the full load rating of the meter that is to be tested. A conductor 40 serves to connect the winding 25 to the line side of conductor 11, while conductor 41 serves to connect the switches 35, 36, 37, 38 and 39 to the load side of the conductor 11.

It will now be apparent that, when the switch 35 is closed, and fifty amperes flow through the winding 25, one hundred ampere turns will be provided by the current element 14. In like manner, when the switch 36 is closed and twenty-five amperes flows through the series connected windings 25 and 26, one hundred ampere turns will also be provided by the current element 14. Similarly, when the switches 38 and 39 are closed, one hundred ampere turns will be provided on flow, respectively, of five and one amperes through the respective combinations of series connected windings.

As previously indicated, if the windings 25, 26 and 27 are connected in series circuit relation and fifteen amperes flow therethrough, then only ninety ampere turns will be provided. With a view to making up the additional ten ampere turns required, a transformer, shown generally at 45, is provided. The transformer 45 is of the series or current transformer type and comprises a primary winding 46 and a secondary winding 47. For purposes of illustration it may be noted that the primary winding 46 may be provided with three turns and the secondary winding 47 may be provided with sixty-three turns. The switch 37 comprises two poles 37a and 37b. When the switch 37 is closed, it will be obvious that the primary winding 46 of the transformer 45 is connected in series circuit relation with the windings 25, 26 and 27. It will also be observed that the secondary winding 47 is connected across the winding 28 having fourteen turns. On flow of fifteen amperes through the windings 25, 26 and 27 of the current element 14 and through the primary winding 46 of the transformer 45, sufficient current will be caused to flow through the fourteen turns of the winding 28 to provide the additional ten ampere turns required to make up the desired one hundred ampere turns.

This will be apparent when it is recalled that the flow of fifteen amperes through the six turns of windings 25, 26 and 27 produces ninety ampere turns while the transformer 45, because of its ratio of transformation of three to sixty-three, reduces the fourteen turns of the winding 28 effectively to two-thirds of a turn, i. e.

$$3/63 \times 14 = 2/3,$$

which, multiplied by fifteen amperes, provides the ten additional ampere turns, i. e.

$$2/3 \times 15 = 10.$$

It will be obvious that substantially the same effect could be obtained if the winding 27 comprised a greater number of turns, for example, four, and the current flow through the winding 28 were such that the ampere turns provided thereby would be subtracted from, rather than added to, the ampere turns provided by current flow through the windings 25, 26 and 27 under the assumed conditions.

While the switches 35, 36, 37, 38 and 39 have been shown as being individually operable, it will be obvious that it would be preferable to employ a drum type of switch which could be conveniently adjusted to the desired setting. An example of this type of switch is shown in the copending application of Fred Kurz, Serial No. 213,765, filed June 15, 1938, now Patent No. 2,183,617.

As shown in Figure 2 of the drawing, the current element 14' may be provided with an auxiliary winding 48 which can be permanently connected across the secondary winding 47 of the transformer 45, instead of the arrangement shown in Figure 1 of the drawing. A switch 37', having only a single pole, would then be provided for connecting the primary winding 46 in series circuit relation with the windings 25, 26 and 27.

Since further changes may be made in the above constructions, and different embodiments of the invention may be made without departing from the scope thereof, it is intended that all matter contained in the above description or shown in the accompanying drawing shall be interpreted as illustrative, and not in a limiting sense.

I claim as my invention:

1. The combination, in a test watthour meter requiring one hundred ampere turns from its current element for rotating its disc at a predetermined speed and adapted to be connected in different circuits in which the full load current is, respectively, fifty, twenty-five, fifteen, five, or one amperes; of five series connected windings on said current element three of which have two turns each, one has fourteen turns and one has eighty turns; switch means for connecting said windings in different series circuit combinations in each of which the product of the full load current of the circuit to which the meter is connected and the number of series connected turns equals one hundred, a transformer having a primary winding of about three turns and a secondary winding of about sixty-three turns, and switch means for connecting said primary winding in series circuit relation with said three windings and said secondary winding across said winding having fourteen turns whereby substantially one hundred ampere turns are provided on flow of fifteen amperes in the series connection.

2. The combination, in a test watthour meter requiring a fixed number of ampere turns from its current element for rotating its disc at a predetermined speed and adapted to be connected in different circuits in each of which the full load current is different; of a plurality of series connected windings on said current element, one for each circuit, switch means for connecting said windings in different series circuit combinations in each of which the product of the full load current of the circuit to which the meter is connected and the number of series connected turns equals said fixed number, a transformer having primary and secondary windings, and switch means for connecting said primary winding in series circuit relation with certain of said windings and said secondary winding across another of said windings whereby said fixed number of ampere turns is provided on flow of predetermined load current in the last named series circuit.

3. The combination in a test watthour meter requiring a fixed number of ampere turns from its current element for rotating its disc at a predetermined speed and adapted to be connected in different circuits in each of which the full load current is different; of a plurality of series connected windings on said current element, one for each circuit, switch means for connecting said windings in different series circuit combinations in each of which the product of the full load current of the circuit to which the meter is connected and the number of series connected turns equals said fixed number, an auxiliary winding on said current element, a transformer having primary and secondary windings, circuit means for connecting said auxiliary winding across said secondary winding, and switch means for connecting said primary winding in series circuit relation with certain of said windings whereby said fixed number of ampere turns is provided on flow of predetermined load current in the last named series circuit.

4. A test watthour meter comprising a voltage magnet and a multirange current magnet, wherein the current magnet is designed to provide a fixed number of ampere turns when the meter is energized with different predetermined magnitudes of load current; said current magnet comprising a core, a plurality of independent windings of different, predetermined, even numbers of turns disposed on said core, all but one of said windings, when used singly or in combination with others, and when energized by the predetermined magnitude of load current, being designed to produce the said fixed number of ampere turns; said one winding being energized through transforming means having such a turn ratio as to produce effectively the required number of turns for that winding, when it is used in combination with others of the plurality of windings, and switch means for effecting the necessary combination of windings to be energized by a predetermined load current, for maintaining the said fixed number of ampere turns at that magnitude of load current.

FREDERICK C. HOLTZ.